May 24, 1966   F. G. BARDWELL   3,253,203
MOTOR BRAKING CIRCUIT
Filed Nov. 29, 1962
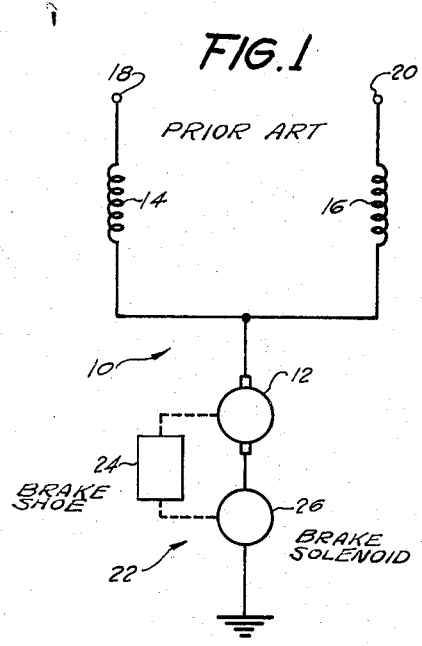
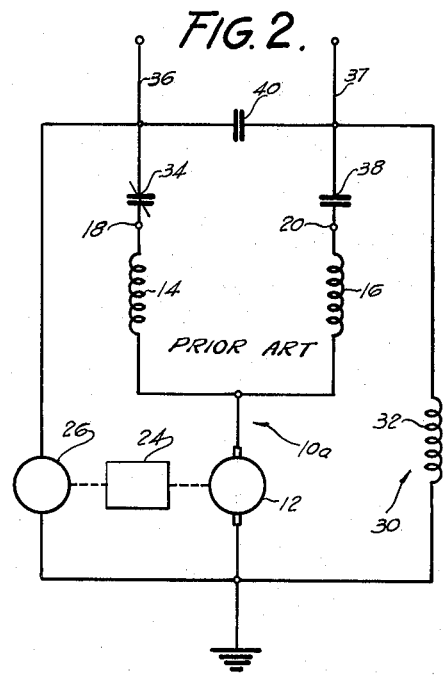
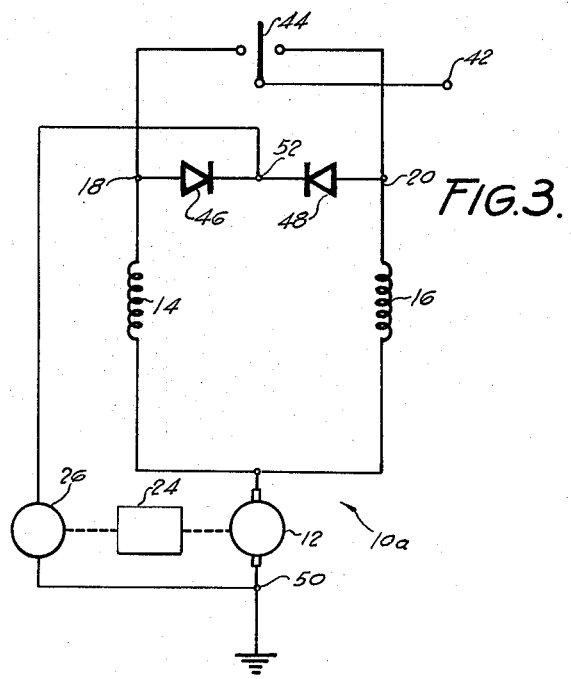
INVENTOR
Francis G. Bardwell
By William J. Newman
Attorney

United States Patent Office

3,253,203
Patented May 24, 1966

3,253,203
MOTOR BRAKING CIRCUIT
Francis Gregory Bardwell, Chicago, Ill., assignor to Stewart-Warner Corporation, Chicago, Ill., a corporation of Virginia
Filed Nov. 29, 1962, Ser. No. 240,862
5 Claims. (Cl. 318—252)

This invention relates to brake circuits for electric motors, and more particularly to brake circuits for split-field, series type electric motors. A split-field, series type electric motor comprises two field windings each of which are series connected with the armature winding. The field windings are adapted and arranged to drive the armature in opposite directions depending on which field winding is connected to an electric source. As is well known series motors are operable with either A.C. or D.C. current and are, hence, commonly referred to as universal motors.

Split-field universal motors are especially adaptable for use in small load servo-systems because of their reversable direction character and their general versatility. An example of an ideal application of such motors may be seen in copending application Serial No. 117,106, filed June 14, 1961, now Patent No. 3,175,145 filed by Frans Brouwer wherein is disclosed a height control device for torch cutting machines. In this device a signal dependent on the height of the torch above the work piece is fed to a motor. If the torch is above the predetermined height the motor operates to lower the torch, and if it is below the motor operates oppositely to raise it.

An accurately operating servo-system requires that the motor follow the commands closely without undue coasting after the signal has been released. Since universal motors are fairly free running after signal release their use in servo systems requires some sort of braking arrangement.

It is an object of this invention to provide a simple and inexpensive brake circuit for a split-field, series motor.

It is also an object of this invention to provide a braking circuit for a split-field, series motor which requires no alteration of the motor.

It is a further object of this invention to provide a braking circuit for a split-field, series motor in which expensive relays and circuitry are not needed.

Also it is an object of this invention to provide a brake circuit for a split-field universal motor which is operable whether A.C. or D.C. current is used to energize the motor.

The invention will be more readily understood with the following description, especially when taken in view of the accompanying drawings, of which:

FIGURE 1 is a schematic diagram of a prior art braking arrangement for split-field, series motors;

FIGURE 2 is a schematic diagram of another prior art braking arrangement for split-field, series motors; and FIGURE 3 is a schematic diagram of a brake circuit for a split-field, series type motor embodying the teachings of this invention.

FIG. 1 of the accompanying drawings is a schematic diagram of a braking arrangement commonly used with split-field series motors. Describing this prior art arrangement in detail the motor 10 comprises an armature 12 which is series connected to two field windings 14 and 16. These windings are connectable at terminals 18 and 20 to an electric current source, the direction of rotation of the armature being dependent on which field winding is being energized.

An electro-mechanical brake 22 is provided which has a friction member 24, such as a shoe or a disk, which is in normal engagement to brake the armature in its non-energized state. A solenoid 26 is series connected with the armature 12 for operating the friction member 26 to disengage it upon application of an electric current. Thus, the brake is disengaged when current passes through the armature regardless of which field winding is energized and which direction the armature is rotating. When the electric current is removed from the motor the solenoid 26 causes the friction number 24 to fall back and reengage the armature.

It is to be noted that this braking arrangement requires that the motor be specially built or substantially modified to provide the solenoid 26 in the armature circuit and maintain the frame of the motor at ground potential at all times. A specially built motor is satisfactory if one contemplates the need for a brake at the time of purchasing the motor. However, it is often desirable to provide a brake for a split-field, series motor that has originally been purchased without one. The brake arrangement of FIG. 1 does not readily lend itself to this type application.

FIG. 2 is a schematic diagram of another prior art arrangement for providing a brake for a split-field series motor. The motor 10a in this case is not specially built and comprises an armature 12 with the two field windings 14 and 16 commonly connected thereto with terminals 18 and 20 for connection to an electric current source.

The brake for this arrangement includes a friction member 24 and the solenoid 26 for operating the friction member to disengage same upon application of electric current.

This system requires a somewhat complicated circuit including a relay 30 to ensure the proper flow of current through the field windings and the solenoid for the two directional operation of the motor. The relay 30 has a set of normally closed contacts in series with the field winding 14 and a set of normally open contacts 38 in series with field winding 16. A set of normally open contacts 40 interconnects the two power leads 36 and 37 for the field windings. The coil 32 of relay 30 is connected in parallel across the armature 12, field winding 16 and contacts 38, while the brake solenoid 26 is connected in parallel across the armature 12, field winding 14, and contacts 34.

This circuit operates in the following manner. When power is supplied to the field winding 14 through power lead 36 and normally closed contacts 34, the armature 12 is activated to rotate in one direction. The parallely connected brake solenoid 26 is also activated so as to release the friction member 24 from braking engagement with the armature 12. Normally open contacts 40 prevent the other field winding 16 and relay coil 32 from being energized.

When electric current is applied to power lead 37 to operate the motor in the other direction the relay coil 32 is first energized to operate its three sets of contacts 34, 38 and 40. Contacts 38 close to provide current to the field winding 16 and contacts 40 close to provide current to the brake solenoid 26 so as to release the brake friction 24. Normally closed contacts 34 open upon the energization of relay coil 32 to prevent current being fed to the field winding 14.

Although the circuit of FIG. 2 is applicable to split-field motors not originally constructed with brakes, it can be seen that it is a complicated system requiring an expensive relay with three sets of contacts. The system is subject to limited reliability in view of the nature of relays.

Both of the systems of FIGS. 1 and 2 respectively are subject to another common disadvantage. As hereinbefore mentioned series motors may be used with either A.C. or D.C. current. It will be noted, however, that by adding the brake to these systems, they are necessarily limited to the particular type current for which the brake is designed to operate. If the brake solenoids 24 are operable with A.C. current, then the motors 10 and 10a are no longer operable with D.C. current and vice versa when D.C. type solenoids 26 are chosen.

Reference is now made to FIGURE 3 for a description of the braking system embodying the teachings of this invention. The motor 10a is the same as described for FIG. 2 and includes the two field windings 14 and 16 commonly connected to one side of the armature 12. The two field winding terminals 18 and 20 are connectable to an electric current source 42 by means such as switch 44 to selectively energize either of the field windings 14 and 16 in series with the armature 12. Being a series motor the current source at 42 may be either alternating or direct. A pair of back-to-back diodes 46 and 48 are series connected across the motor terminals 18, 20.

The brake comprises again the friction member 24, which may be a shoe or a disk, and solenoid 26 which operates to release the normally engaged friction member 24 upon application of an electric current. The solenoid 26 is of the direct current operated type and is connected between the ground terminal 50 of the motor and a point 52 between the back-to-back diodes 46, 48.

This circuit operates in the following manner. When the switch 44 is closed to provide current to one of the field windings, for example field winding 14, the field winding and armature 12 are energized to operate the motor in a particular rotational direction. When the current source 42 is alternating diode 46 operates as a half-wave rectifier to apply pulsating D.C. current to the brake solenoid 26, thus causing the release of the friction member 24 and permitting rotation of the armature. Diode 48 serves to block the half cycles passing through diode 46 so as to prevent any current from reaching the opposite direction field winding 16. As may be seen when the switch 44 is operated to its other position, the circuit elements operate in a reverse fashion to energize the field winding 16 but maintaining pulsating D.C. current through brake solenoid 26 in the same direction so as to release the friction member 24.

When the electric current source 42 provides a direct current of positive polarity in the particular connection shown in FIG. 3, the diodes serve to pass the current through the selected field winding 14 or 16 and the brake solenoid 26 while preventing its passage through the non-selected field winding. Thus, regardless of the type of electric current source selected, the brake circuit will operate to release the friction member upon application of energizing current and cause the friction member to engage the armature to brake same when current is released.

While there has been described herein a single embodiment of the invention, it is to be understood that many modifications and changes may be made thereto without departing from the teachings herein. It is therefore intended that the invention be limited only by the accompanying claims.

What is claimed is:

1. In combination, a motor having an armature winding, a first field winding connected at one end to said armature for driving said armature in one direction, a second field winding connected at one end to said armature for driving said armature in the opposite direction, means for connecting an electric current source to a selected one of said field windings, a brake having a friction member normally engaged to prevent rotation of said armature, a pair of back-to-back diodes series connected between the other ends of said field winding, a solenoid having one end connected between said diodes and the other end connected to said armature, said solenoid operable upon receipt of electric current to release said friction member.

2. In combination a split field series motor having an armature winding, a first field winding connected at one end to one end of said armature winding for driving said armature in one direction, a second field winding connected at one end to said end of said armature winding for driving said armature in the opposite direction, means for connecting an electric current source to a selected one of said field windings, a brake having a friction member normally engaged to prevent rotation of said armature, a pair of back-to-back diodes series connected between the other ends of said field winding to form two series branches each including a diode, a field winding and said armature, and a solenoid parallely connected across said series branches, said solenoid operable upon receipt of electric current to release said friction member.

3. In combination, a split field series motor having an armature winding, a first field winding connected at one end to one end of said armature winding for driving said armature in one direction, a second field winding connected at one end to said end of said armature winding for driving said armature in the opposite direction, means for connecting an electric current source to a selected one of said field windings, a brake having a friction member normally engaged to prevent rotation of said armature, a pair of back-to-back diodes series connected between the other ends of said field winding, a solenoid having one end connected between said diodes and the other end connected to the other end of said armature winding, said solenoid operable upon receipt of electric current to release said friction member.

4. For use with a universal motor having a first field winding for energizing said motor to rotate in one direction and a second field winding for energizing said motor to rotate in the opposite direction, a brake and reversing system therefor comprising means for providing an electric current through a selected one of said field windings to drive said motor in a selected direction, a brake having a friction member normally braking said motor, a solenoid for releasing said friction member, and means including unidirectional current passing elements for simultaneously energizing said solenoid with either of said windings while preventing energization of the other field winding.

5. For use with a universal motor having a first field winding for energizing said motor to rotate in one direction and a second field winding for energizing said motor to rotate in the opposite direction, a brake and reversing system therefor comprising means for providing an electric current through a selected one of said field windings to drive said motor in a selected direction, a brake having a friction member normally braking said motor, a solenoid for releasing said friction member, and means including back-to-back diodes connected between said field windings for simultaneously energizing said solenoid with either of said field windings while preventing energization of the other field winding.

References Cited by the Examiner

UNITED STATES PATENTS

| | | | |
|---|---|---|---|
| 2,600,568 | 6/1952 | Nelson | 318—372 X |
| 2,623,202 | 12/1952 | Kronacher | 318—372 X |
| 2,913,651 | 11/1959 | Smith et al. | 318—297 |
| 2,923,872 | 2/1960 | Herzog | 318—297 |

ORIS L. RADER, *Primary Examiner.*

D. F. DUGGAN, S. GORDON, *Assistant Examiners.*